(12) United States Patent
Anderson et al.

(10) Patent No.: US 11,386,170 B2
(45) Date of Patent: Jul. 12, 2022

(54) SEARCH DATA CURATION AND ENRICHMENT FOR DEPLOYED TECHNOLOGY

(71) Applicant: BMC Software, Inc., Houston, TX (US)

(72) Inventors: Eric Michael Anderson, Friendswood, TX (US); G S Narayan Iyer, Houston, TX (US); Ajoy Kumar, Santa Clara, CA (US)

(73) Assignee: BMC Software, Inc., Houston, TX (US)

( * ) Notice: Subject to any disclaimer, the term of this patent is extended or adjusted under 35 U.S.C. 154(b) by 290 days.

(21) Appl. No.: 16/835,926

(22) Filed: Mar. 31, 2020

(65) Prior Publication Data

US 2021/0303645 A1 Sep. 30, 2021

(51) Int. Cl.
*G06F 16/00* (2019.01)
*G06F 16/9532* (2019.01)
*H04L 67/00* (2022.01)
*G06F 16/9538* (2019.01)
*G06N 20/00* (2019.01)

(52) U.S. Cl.
CPC ...... *G06F 16/9532* (2019.01); *G06F 16/9538* (2019.01); *G06N 20/00* (2019.01); *H04L 67/34* (2013.01)

(58) Field of Classification Search
CPC ............ G06F 16/9532; G06F 16/9538; G06F 16/383; G06N 20/00; H04L 67/34; G06Q 10/0635; G06Q 10/10; G06Q 10/20
See application file for complete search history.

(56) References Cited

U.S. PATENT DOCUMENTS

| | | | | |
|---|---|---|---|---|
| 8,037,527 B2 * | 10/2011 | Milener | ................ | G06F 21/566 713/188 |
| 2009/0077666 A1 * | 3/2009 | Chen | ..................... | G06F 21/577 726/25 |
| 2012/0011588 A1 * | 1/2012 | Milener | .............. | H04L 63/1425 726/22 |

* cited by examiner

*Primary Examiner* — Jared M Bibbee
(74) *Attorney, Agent, or Firm* — Brake Hughes Bellermann LLP

(57) ABSTRACT

A content engine may utilize a configuration management database (CMDB) to manage a configuration of a technology landscape. A curation manager 102 may utilize a plurality of article sources to provide, in collaboration with the content engine, a plurality of enriched articles that are specific to the technology landscape. The enriched articles enable an IT administrator using the content engine to execute IT administration duties in a fast, efficient, reliable, and timely manner.

20 Claims, 7 Drawing Sheets

SEARCH DATA CURATION AND ENRICHMENT FOR DEPLOYED TECHNOLOGY

TECHNICAL FIELD

This description relates to data curation and enrichment for deployed technology for relevant knowledge articles relating to security threats or the cybersecurity vulnerability of information technology assets.

BACKGROUND

Many companies and other entities have extensive technology landscapes, which include numerous information technology (IT) assets, including hardware and software. Such technology landscapes may be subject to both internal and external changes that may occur over time. For example, internal changes may relate to expansion of a company's workforce or product lines, or malfunctions of existing IT assets. External changes may include newly-available hardware or software, or cyber security threats.

IT administrators are often charged with assessing a need for, and executing, updates to technology landscapes. Thus, IT administrators generally maintain, repair, configure, expand, and secure the various IT assets of a technology landscape.

Meanwhile, information is continually published that may (or may not) affect a particular technology landscape. Given the volume of such published information, and a size of a technology landscape(s), it is difficult or impossible for IT administrators to fulfill their duties in an efficient, reliable, and timely manner.

For example, an IT administrator charged with securing a technology landscape against cyber attacks may begin each day with an awareness of thousands of articles that have published regarding potential security threats. It is not feasible for such an IT administrator to review all such articles, or even to determine a subset of the articles that may be relevant to the technology landscape being administered. Even for the articles that the IT administrator has time to review, it may be difficult to determine a type or degree of relevance to the technology landscape being managed. Nonetheless, cyber attacks often require a fast and efficient response in order to secure IT assets from damage, loss of data, or other negative outcomes.

SUMMARY

According to one general aspect, a computer program product may be tangibly embodied on a non-transitory computer-readable storage medium and may include instructions to be executed by at least one computing device. When executed, the instructions may be configured to cause the at least one computing device to receive configuration data from landscape inventory data characterizing configuration items of information technology (IT) assets of a technology landscape, and receive articles collected from article sources identified as being potentially relevant to the technology landscape. When executed, the instructions may be configured to cause the at least one computing device to generate, for each article, at least one topic, based on the configuration data, including a relevancy metric characterizing a degree of relevance of each article to each corresponding topic, store the articles with reference to each corresponding topic and relevancy metric, and select, for the technology landscape, prioritized articles from the articles, based on the landscape inventory data, the topics, and the relevancy metrics. When executed, the instructions may be configured to cause the at least one computing device to identify relevant configuration items of the configuration items that correspond to the prioritized articles, and update each of the prioritized articles with enrichment information identifying article portions of the prioritized articles related to the relevant configuration items, to thereby obtain enriched articles, including identifying the relevant configuration items within the enrichment information.

According to another general aspect, a computer-implemented method includes receiving configuration data from landscape inventory data characterizing configuration items of information technology (IT) assets of a technology landscape, and receiving articles collected from article sources identified as being potentially relevant to the technology landscape. The method includes generating, for each article, at least one topic, based on the configuration data, including a relevancy metric characterizing a degree of relevance of each article to each corresponding topic, storing the articles with reference to each corresponding topic and relevancy metric, and selecting, for the technology landscape, prioritized articles from the articles, based on the landscape inventory data, the topics, and the relevancy metrics. The method further includes identifying relevant configuration items of the configuration items that correspond to the prioritized articles, and updating each of the prioritized articles with enrichment information identifying article portions of the prioritized articles related to the relevant configuration items, to thereby obtain enriched articles, including identifying the relevant configuration items within the enrichment information.

According to another general aspect, a system includes at least one memory including instructions, and at least one processor that is operably coupled to the at least one memory and that is arranged and configured to execute instructions. When executed, the instructions may be configured to cause the at least one processor to receive configuration data from landscape inventory data characterizing configuration items of information technology (IT) assets of a technology landscape, and receive articles collected from article sources identified as being potentially relevant to the technology landscape. When executed, the instructions may be configured to cause the at least one processor to generate, for each article, at least one topic, based on the configuration data, including a relevancy metric characterizing a degree of relevance of each article to each corresponding topic, store the articles with reference to each corresponding topic and relevancy metric, and select, for the technology landscape, prioritized articles from the articles, based on the landscape inventory data, the topics, and the relevancy metrics. When executed, the instructions may be configured to cause the at least one processor to identify relevant configuration items of the configuration items that correspond to the prioritized articles, and update each of the prioritized articles with enrichment information identifying article portions of the prioritized articles related to the relevant configuration items, to thereby obtain enriched articles, including identifying the relevant configuration items within the enrichment information.

The details of one or more implementations are set forth in the accompanying drawings and the description below. Other features will be apparent from the description and drawings, and from the claims.

DETAILED DESCRIPTION

Figure 1:
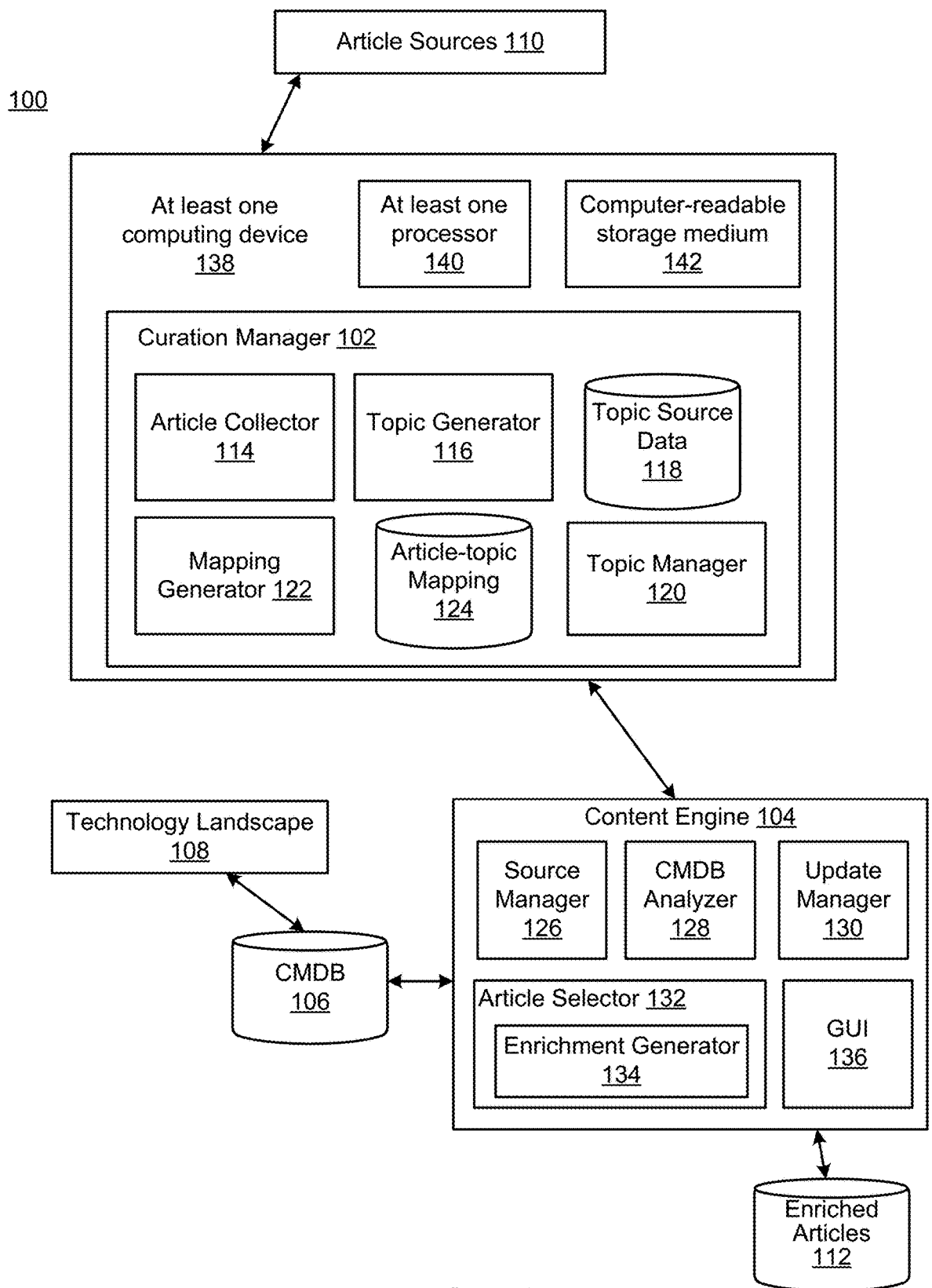
FIG. 1 is a block diagram of a system for search data curation and enrichment for deployed technology.

FIG. 1 is a block diagram of a system 100 for search data curation and enrichment for deployed technology. In the example of FIG. 1, a curation manager 102 is configured to interact with a content engine 104. As shown, the content engine 104 utilizes a configuration management database (CMDB) 106 to manage a configuration of a technology landscape 108. As described in detail, below, the curation manager 102 may be configured to utilize a plurality of article sources 110 to provide, in collaboration with the content engine 104, a plurality of enriched articles 112 that are specific to the technology landscape 108, and that enable (e.g., provides information that allows) an IT administrator using the content engine 104 to execute IT administration duties in a fast, efficient, reliable, and timely manner.

Figure 3:
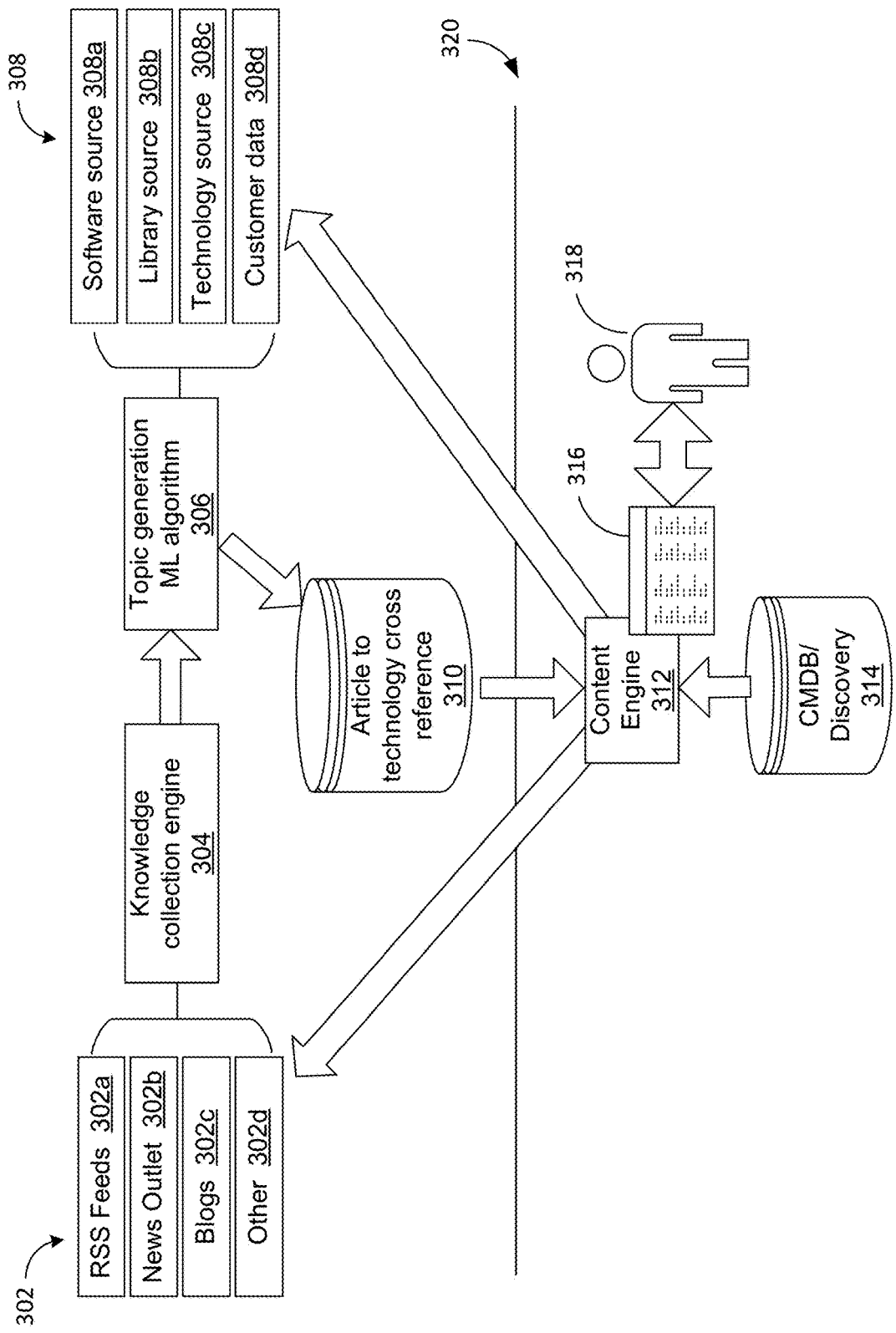
FIG. 3 is a block diagram of an example implementation of the system of FIG. 1.

In some implementations, the curation manager 102 may be configured to interact with many different instances of the content engine 104, although only the single content engine 104 is illustrated in FIG. 1, for the sake of simplicity. For example, the content engine 104 may be implemented onsite at a business or other entity. The curation manager 102 may be hosted in the cloud and may service a plurality of such content engines (104). For example, the system 100 of FIG. 1 may be implemented with the content engine 104 implemented on a per-customer basis for customers of a host, as shown in FIG. 3.

Further in FIG. 1, the CMDB 106 represents any suitable landscape inventory data and associated software, such as monitoring software used to continually monitor the technology landscape 108 and update the CMDB 106 with respect thereto. The CMDB 106 may store configuration data, including specific configuration items, characterizing the individual IT assets of the technology landscape 108. The technology landscape 108 may include local or distributed IT assets, including cloud-based IT assets.

The CMDB 106 may be configured to identify (discover) all IT assets of the technology landscape 108, discover and maintain a current state of each of the IT assets, and provide authorized access to all such configuration data. The CMDB 106 also may capture and store attributes and other metadata characterizing the IT assets, such as importance/criticality of each asset.

In particular, as described in detail, below, the CMDB 106 may be configured to discover and store relationships between IT assets. For example, such relationships may characterize and reflect a manner and extent to which different IT assets interact with one another in executing assigned tasks. For example, an output of a particular IT asset may be required as input by a number of other IT assets, in order for the latter IT assets to perform their assigned tasks.

As referenced above, the technology landscape 108 may include a vast number of IT assets. In addition to a potentially large number of hardware assets, each such hardware asset may include a different number and type of software assets. Some of the assets in a technology landscape 108 may be owned, while others may be utilized on a subscription-model basis, e.g., cloud-based. The technology landscape 108 also may be referred to as an ecosystem, or other suitable term. As just referenced, each of its hardware and software assets may have multiple characteristics, requirements, and relationships. Therefore, the CMDB 106 may be required to store and manage an extremely large quantity of inventory and configuration data.

Meanwhile, as represented by the article sources 110, information needed by an IT administrator to manage the technology landscape 108 is updated, and potentially changed, every hour of the day. For example, as illustrated and described in more detail, below, e.g., with respect to FIG. 3, the article sources 110 may include Really Simple Syndication (RSS) feeds, news sources, blogs, and many other sources.

In the present description, the term article is thus used to refer to any discrete publication or information that is available on an accessible network, and that may be searched for, or otherwise collected by, the curation manager 102. As such, articles typically have a publication date, title, author, and other identifying metadata.

Such articles may contain important and time-critical information that is relevant to the technology landscape 108. For example, an article author may publish an article describing a new security threat, such as a virus or other malware. More generally, when such a new security threat is found to exist, many different authors may publish related articles, where some such articles may contain specific suggestions for potential remedies that may be applicable to specific IT assets, which may or may not be present in the technology landscape 108. For example, a security threat may have different types of remedies for different operating systems or platforms.

Thus, without the curation manager 102, it is difficult or impossible for an IT administrator to utilize the article sources 110 in a practical or effective manner. For example, an IT administrator may use conventional news feeds or other access to the article sources 110, but the result would just be that the IT administrator is faced daily, and even hourly, with a huge number of articles. Attempts to review (or search through) large numbers of articles is likely to provide a low yield of useful information for the time invested/required, and to result in the overlooking of relevant, time-sensitive, and/or critical information.

Moreover, in many cases, an IT administrator may not even be aware that information in a particular article may be relevant, and therefore may not know to search for such information, even if there were time to search for such and the information were included in an article(s). Similarly, even if the IT administrator actually reviews a relevant article, the relevance and importance may be lost if the IT administrator is not aware of the inclusion (or importance) of the related configuration item in the CMDB 106.

In contrast, in FIG. 1 and as described in detail, herein, the curation manager 102 interacts with the content engine 104 to provide the enriched articles 112. For example, the enriched articles 112 may be high priority articles that are relevant to threats related to or vulnerabilities in the most critical IT assets of the technology landscape 108. Moreover, as also described below, the enrichment of the enriched articles 112 may include specific identification of the most critical IT assets and the relevance of identified portions of the enriched articles 112 thereto. In some implementations, for example, the enriched articles 112 may include links to corresponding data within the CMDB 106, so that an IT administrator may immediately begin taking action with respect to the identified threat or opportunity.

In operation, the curation manager 102 includes an article collector 114. The article collector 114 may interact with the article sources 110 to proactively collect potentially relevant articles. A manner in which the article collector 114 interacts with the article sources 110 may depend on the natures of the article sources 110.

For example, the article collector 114 may subscribe to an article source such as a news feed. In other examples, the article collector 114 may perform scraping of identified websites on a scheduled basis.

In general, the article collector 114 collects a wide array of potentially relevant articles that may contain information with respect to threats related to or vulnerabilities in the IT assets in the technology landscape 108. As described below, potential article sources of the article sources 110 may be identified by the content engine 104, or by an IT administrator of the curation manager 102.

As the content engine 104 represents one instance of a plurality of content engines, the article collector 114 may be configured, and the article sources 110 may be selected, for aggregate article selection that affects all, or an identified subset, of such content engines. In this way, even if the specific content engine 104 or an IT administrator of the curation manager 102 fails to identify a particular article source that may be important, the article collector 114 may still be configured to access such an article source due to its inclusion by another content engine.

A topic generator 116 may be configured to utilize topic source data 118 to analyze collected articles and generate corresponding topics determined by a topic manager 120. In particular, as described in more detail with respect to FIG. 3, the topic manager 120 may be configured to include topics that relate to, or are determined by, the content of the CMDB 106 with respect to the technology landscape 108.

In specific implementations, the topic generator 116 may implement a machine learning algorithm that is trained using the topic source data 118. Thus, it will be appreciated, for example, that the term topic does not refer necessarily to an article topic that may be intended by an article author. Rather, the term topic in this context refers to potential relevance (e.g., degree of relevance) of content of each article to one or more of the topics included in the topic source data 118.

For example, an article obtained by the article collector 114 may ostensibly be about a financial impact, or stock price impact, of a data breach experienced by a particular company as a result of a computer virus affecting a particular IT configuration of that company (e.g. a type(s) of hardware or software being used that was affected). The topic generator 116 may be configured to generate a topic identifying the virus and IT configuration, as well as a degree of relevance of the article to the topic.

A mapping generator 122 may be configured to cross-reference the articles and associated topics for storage within an article-topic mapping repository 124. For example, a given article may be associated with two or more topics. In example implementations, the article-topic mapping repository 124 may provide an indexed, searchable data source that may be utilized by the content engine 104 to generate the enriched articles 112 that are specific to the CMDB 106 and the technology landscape 108.

As referenced above in the description of the curation manager 102, the content engine 104 may include various components configured to provide information to be used by the curation manager 102. In some cases, such information may supplement similar information at the curation manager 102. For example, a source manager 126 may be configured to communicate with the curation manager 102, e.g., the article collector 114, to identify specific article sources 110 to be included in article collections by the article collector 114, as well as any specific collection techniques that may be required or preferred. In this way, for example, individual customers may request article sources in addition to article sources identified by an operator of the curation manager 102.

A CMDB analyzer 128 may be configured to provide ongoing, dynamic analysis of the CMDB 106. In some implementations, the CMDB analyzer 128 may be implemented as, or including, monitoring functionality associated with the CMDB 106, and may be considered to be part of the CMDB 106.

In general, the CMDB 106 may be updated on a regular and potentially frequent basis. For example, additions and other changes may be made to the technology landscape 108 and its IT assets, such as installation of new software, or the establishment of new relationships or dependencies between existing hardware or software. As described in detail, below, such changes may have an affect of changing a relative priority of articles and/or topics provided by the curation manager 102.

An update manager 130 may be configured to provide these and other aspects of the CMDB 106 to the curation manager 102, e.g., to the topic manager 120. In other words, the update manager 130 provides topic source contributions to be included within the topic source data 118.

An article selector 132 may be configured to interact with the article-topic mapping 124 to select prioritized articles to be enriched by an enrichment generator 134. For example, the article-topic mapping 124 may identify many thousands or millions of articles and associated topics and may be accessed by multiple content engines.

Moreover, even for the specific content engine 104, the article selector 132 may be configured to obtain only the subset of articles and topics that are most relevant or most important for management of the technology landscape 108. For example, the article selector 132 may utilize data from the CMDB analyzer 128 to generate search terms to use in accessing the article-topic mapping 124, to thereby obtain high priority articles for enrichment.

For example, the article selector 132 may implement a multi-factor, weighted analysis to use in accessing the article-topic mapping 124. One factor may include a degree of relevance of an article to an associated topic, which may be expressed by the topic generator 116 as a percentage. For example, the article-topic mapping 124 may store an article and topic mapping together with a quantification that the article is 90% relevant to the topic. In some implementations, articles may be ranked based on such relevancy scores.

Another factor may include a prioritization based on analyses of the CMDB analyzer 128. For example, the CMDB analyzer 128 may determine that a particular IT asset or type of asset has a large number of dependency relationships with respect to other IT assets. Then, such an IT asset or asset type may be used as a factor in prioritizing access to the article-topic mapping 124.

Another factor may include a recency of each article. For example, an article published during a preceding day may be considered more valuable or important than an older article. Use of article recency is discussed in more detail below, with respect to FIG. 4.

Yet another factor may include a relative importance or priority of a topic that is determined independently of current configuration items of the CMDB 106. For example, a particular virus or other threat that might affect the technology landscape 108 might be deemed sufficiently harmful to identify such a threat as high priority, even for relatively low chances of that threat being relevant to the technology landscape 108. For example, a company may place a high value on maintaining confidentiality of client information and may continually prioritize threats related to data breaches that would compromise customer confidentiality, independent of recent or current changes to the technology landscape 108.

Combining the above examples, the article selector 132 may be configured to select articles and associated topics from the article-topic mapping 124 using a formula such as $W_1$ (topic relevance)*$W_2$ (prioritization)*$W_3$ (threat level)*$W_4$ (recency), where $W_n$ refers to a selectable weight that may be assigned by an IT administrator in specific implementations.

It will be appreciated that these factors, and other factors, may be defined and calculated in any suitable manner. For example, 'threat level' and 'recency' may be combined with one another and/or with 'prioritization' to provide a combined selection factor, or, in other implementations, 'prioritization' may refer just to internal factors, such as total number of deployed IT assets, or number/types of relationships between IT assets. Further, some of the factors may be calculated at the curation manager 102, while others are calculated at the content engine 104. The various factors may be combined at the content engine 104, e.g., at the article selector 132, as part of the enrichment process.

Specifically, for example, the enrichment generator 134 may be configured to search for terms, highlight portions, or identify relevant portions of each selected article in order to facilitate an ability of an IT administrator to respond to a threat or vulnerability identified by the article selector process, as reflected in the selected article. For example, the enrichment generator 134 may have access to the criteria used to select an article from the article-topic mapping 124 and may search the selected article for corresponding terms or portions.

The described enrichment may include more than simply highlighting or identifying such article portions, or other article aspects, although such highlighting or identifying may be included. For example, enrichment may include specific references to corresponding portions of the CMDB 106, such as individual fields or records of a database, or metadata characterizing such fields or records.

For example, a selected article may be enriched by identifying an article paragraph or portion that identifies a specific type of CI, and the enrichment may include the providing of relevant information for that type of CI within the CMDB 106 (e.g., a number of deployed instances thereof). In other examples, the enrichment may include one or more links, so that an IT administrator selecting such a link may be provided with a configuration field for updating or otherwise configuring the CI in question.

In some implementations, the enrichment generator 134 may be configured to compile or aggregate information from the CMDB 106. For example, if two or more types of CIs are relevant, the enrichment generator 134 may aggregate and provide a total number of instances thereof.

In FIG. 1, a graphical user interface (GUI) 136 represents one or more user interfaces with which an IT administrator or other user may access the content engine 104, and/or the CMDB 106. For example, the GUI 136 may be used to configure any of the source manager 126, the CMDB analyzer 128, the update manager 130, and the article selector 132 (including the enrichment generator 134).

The GUI 136 may be used to view the enriched articles 112. Further, the GUI 136 may be used to interact with the enriched content of the enriched articles, such as accessing links to the CMDB 106.

In FIG. 1, the curation manager 102 is illustrated as being implemented using at least one computing device 138, including at least one processor 140 and a non-transitory computer-readable storage medium 142. That is, the non-transitory computer-readable storage medium 142 may store instructions that, when executed by the at least one processor 140, cause the at least one computing device 138 to provide the functionalities of the curation manager 102, and related functionalities.

For example, the at least one computing device 138 may represent one or more servers. For example, the at least one computing device 138 may be implemented as two or more servers in communications with one another over a network.

Although the curation manager 102 is illustrated separately from the content engine 104, it will be appreciated that some or all of the respective functionalities of either of the curation manager 102 and the content engine 104 may be implemented partially or completely in the other, or in both.

For example, the enrichment generator 134 is illustrated as being implemented at the content engine 134. However, in some implementations, enrichment may occur partially or completely at the curation manager 102, e.g., depending on what data is available at the curation manager 102, and/or on a nature of the enrichment to be performed.

For example, as described above, the article-topic mapping 124 may include a reference or description of an extent to which each topic relates to each article, as determined by the topic generator 116. This degree of topic relevancy may be included, or utilized in, article enrichment. Similarly, the topic generator 116 may be configured to identify article portions contributing most heavily to a topic determination and/or degree of relevancy.

Figure 2:
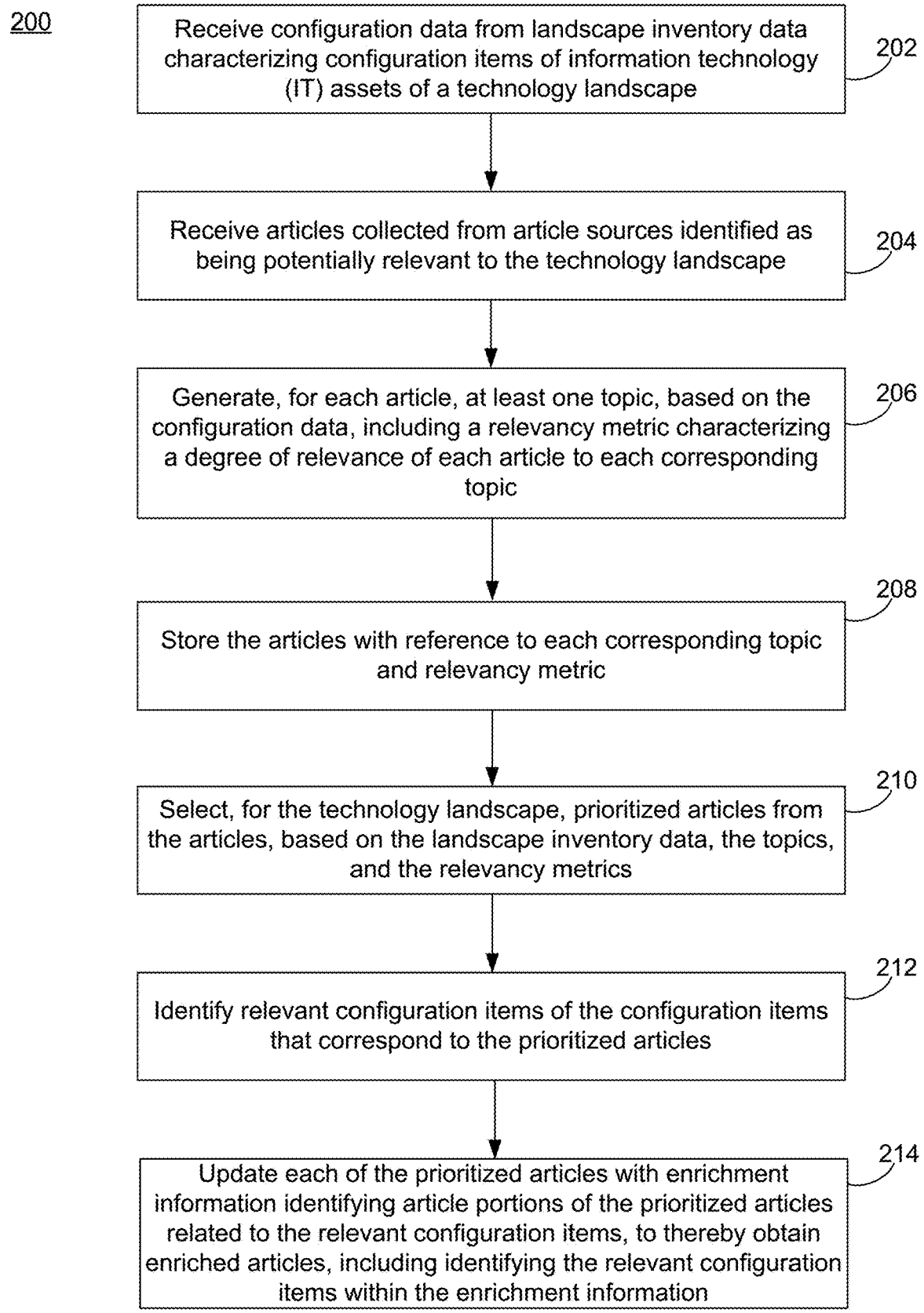
FIG. 2 is a flowchart illustrating example operations of the system of FIG. 1.

FIG. 2 is a flowchart illustrating example operations of the system of FIG. 1. In the example of FIG. 2, operations 202-214 are illustrated as separate, sequential operations. In various implementations, the operations 202-214 may include sub-operations, may be performed in a different order, may include alternative or additional operations, or may omit one or more operations. Further, in all such implementations, included operations may be performed in an iterative, looped, nested, or branched fashion.

In the example of FIG. 2, configuration data from landscape inventory data characterizing configuration items of information technology (IT) assets of a technology landscape may be received (202). For example, the topic manager 120 may receive configuration data from, or related to, the CMDB 106 of FIG. 1, for inclusion in the topic source data 118. For example, as described, the update manager 130 of the content engine 104 may be configured by way of the GUI 136 to select and provide suitable configuration data. The update manager 130 may receive updated CMDB information, e.g., from the CMDB analyzer 128.

Articles collected from article sources identified as being potentially relevant to the technology landscape may be received (204). For example, the article collector 114 may collect articles from the article sources 110. In some examples, as described, the source manager 126 of the content engine 104 may contribute or identify article sources to supplement the article sources identified by the article collector 114. Alternatively, or additionally, the article sources 110 may be identified and selected at the curation manager 102.

For each article, at least one topic may be generated, based on the configuration data, and including a relevancy metric characterizing a degree of relevance of each article to each corresponding topic (206). For example, the topic generator 116 may utilize the topic source data 118 to implement a machine learning algorithm for topic generation. As just referenced above, the topic source data 118 may include or characterize aspects of the CMDB 106 and may include other configuration data that is not specific to the CMDB 106, as well. In generating each topic, the topic generator 116 may generate a relevancy metric, expressed, e.g., as a percentage or scaled number, indicating a degree of relevance of each topic to each article.

The articles may be stored with reference to each corresponding topic and relevancy metric (208). For example, the mapping generator 122 may store each article/topic/relevancy mapping within the database 124, as described with respect to FIG. 1, above. For example, a relevance score may be included for each article or topic mapping, as well.

Prioritized articles for the technology landscape may be selected from the articles, based on the landscape inventory data, the topics, and the relevancy metrics (210). For example, the article selector 132 may be configured to access the article-topic mapping 124 and utilize a joint metric that includes priority information obtained from the CMDB 106 by the CMDB analyzer 128, as well as the relevancy rank of the mapped articles, to select topics and corresponding articles.

Relevant configuration items of the configuration items that correspond to the prioritized articles may be identified (212). For example, the enrichment generator 134 may utilize data from the CMDB analyzer 128, including, in some examples, the prioritization data used to select each article, to identify specific configuration items. Correspondence to the prioritized articles may be determined with respect to specific words, paragraphs, or other portions of the prioritized articles.

Each of the prioritized articles may be updated with enrichment information identifying article portions of the prioritized articles related to the relevant configuration items, to thereby obtain enriched articles, including identifying the relevant configuration items within the enrichment information (214). For example, the enrichment generator 134 may be configured to include a link to one or more specific configuration items within the CMDB 106.

FIG. 3 is a block diagram of an example implementation of the system of FIG. 1. FIG. 3 illustrates an implementation that may be provided as a multi-tenant software as a service (SaaS) based knowledge curation system that delivers content related to the infrastructure of a plurality of tenants. More specifically, FIG. 3 illustrates an example implementation directed to cybersecurity.

In FIG. 3, as referenced with respect to the system 100 of FIG. 1, a provider may provide the types of article curation and enrichment described above as a service provided to many different tenants/customers, in order to assist such tenants/customers in identifying and responding to cybersecurity threats. In this regard, as described below, such a provider may leverage information that is available and relevant and provide it to many different instances of content engines, while also providing enriched articles that are specific to the individual content engines.

FIG. 3 illustrates examples of article sources 302, including RSS feeds 302*a*, news outlets 302*b*, blogs 302*c*, and various other sources 302*d*. As referenced above, such article sources 302 are numerous, and it is practically impossible for a person or small team to read and understand them all on a daily, hourly, or regular basis. However, there may be very important pieces of information about emerging threats in each one. Given the thousands of application and technology choices available in modern technology landscapes, a vast majority of such articles will have no relevance to a particular technology landscape at all.

Further in FIG. 3, a knowledge collection engine 304 represents an example of the article collector 114 of FIG. 1. For example, the knowledge collection engine 304 may represent, or utilize, a scraper that may be configured to download any and all new content related to cyber security or any technology discipline relevant to the IT administrators 318.

A topic generation machine learning (ML) algorithm 306, as an example of the topic generator 116 of FIG. 1, may be configured to utilize machine learning to understand the technologies being discussed in the articles and distill them down to relevant ones. Topic sources 308 may include one or more of each of a software source 308*a*, a library source 308*b*, a technology source 308*c*, and customer data 308*d*. In general, the topic sources 308 may include listings of different types of technology, including off the shelf software listings, components, middleware, and customer-specific technology that may be obscure.

Accordingly, the topic generation ML algorithm 306 may generate a cross-reference 310 of article to technology, as an example instance of the article-topic mapping 124 of FIG. 1. Once the cross-reference 310 is available, it becomes possible, via a content engine 312, to compare the vast number of available articles to the technologies in a CMDB 314 (where the CMDB represents any other viable data inventory or discovery source for asset or configuration management, including IT Service Management Suites or similar).

Then, a GUI 316 may be utilized by an IT administrator(s) 318 (which may represent any person or role who might access the GUI 316) to access and view only articles that are relevant to the technology of choice, where such articles are enriched in the various manners described herein. For example, the enriched articles may provide direct links to, and information regarding, specific, relevant configuration items of the CMDB 314. Thus, the cross-reference 310 may represent a database that stores relationships between articles, technology and version information, which may be used by the GUI 316 to serve up recommendations to a user community represented by an IT administrator(s) 318.

As may be appreciated from the above description of FIG. 1, the content engine 312 and the GUI 316 may also be used for providing information to a host (where line 320 indicates a network interface between the customer or tenant site of the content engine 312 and the IT administrator 318, and a host providing the curation and enriched articles described herein). For example, as indicated in FIG. 3, the content engine 312, via the GUI 316, may be configured to identify or select specific article sources from among the sources 302, and to provide customer data 308*d* to the topic source data 308.

In example implementations, the knowledge collection engine 304 may represent a central, shared component that cycles through a list of news sources collecting all articles. Each article downloaded may be passed to the Topic Generation ML algorithm 306, which is responsible for comparing the contents of each article with the variety of technology sources 308 to generate the cross reference 310 between article and any technology. For example, examples of "technology" may be expressed in natural language descriptions that are relevant to a customer, such as "Nginix v8.0", "Apache Tomcat 5, 6", "AWS Compute", "AWS EC2 machines", "Kubernetes", "Kubernetes ingress controller problems", "Vulnerabilities in Oracle Applications", or "CVE-Shell Shock", to name a few.

The cross reference 310 may be configured as a service using a ranking algorithm in which each article is assigned a "relevancy rank" based on the similarity of that article with the "technology" that is being watched. As referenced above, other factors may be included, as well, such as a recency score. For example, the sum of the two may be used.

In further specific example implementations, a similarity score may be generated using a similarity-based algorithm(s) (e.g., the cosine similarity algorithm), in order to determine the degree of match to assign a relevancy rank for each article against a corresponding technology topic. For example, a technology topic "AWS EC2 machines" may generate a ranked order of relevant articles that recently were published.

In some implementations, each topic classified by the topic generation ML algorithm 306 may be referred to as, or include, a specific technology. Then, each such technology may be associated with a ranked order of articles that are highly relevant for that technology, with the highest ranked articles being the most relevant for that technology.

Each technology may have an "importance" score that is determined by a weighted set of factors, such as, e.g., a scale of that technology used in the technology landscape (e.g., when Tomcat is running on 200K servers and Microsoft AD is running on 6 servers), usage patterns of technology services (e.g., Microsoft AD receives 1000 connection request per second vs. Tomcat receiving 200/second), or a number or type of environments (e.g., development) or products in which the technology is found.

Each customer or tenant (e.g., below line 320 in FIG. 3) may be associated with a group or collection of technologies, so that a per-customer aggregate view may be determined. For example, for a customer with a collection of technology strings, an aggregated_score may be calculated as {Technology-importance*relevancy rank} for each technology-article combination, and presented to the customer as a list of articles. The list of articles may be sorted e.g., using such an aggregated score, which may assist the customer in visualizing the articles for the most important technologies for that customer first, e.g., with the most relevant articles for those technologies being listed first.

The cross-reference 310 can also include an aggregate view from the perspective of a service owner. For example, a service owner inside a customer's organization may only be interested in receiving articles that are relevant to a set of services being managed, or related applications or machines. If a service model is available, this information can be used to generate a collection of relevant technologies to prioritize. As described above, an aggregated score may be computed for such a service owner that identifies the most relevant list of articles. This capability allows hundreds of service owners to obtain a customized knowledge feed that is automatically derived from a service model.

In another example, the cross-reference 310 may be organized or accessed on a per technology view, so that an individual type of technologist may obtain desired access. For example, the list of articles may be sorted by a relevancy score for a technology in question. For example, an Oracle DBA or a Kubernetes administrator can watch for "Oracle" or "Kubernetes" articles, respectively.

Thus, the example implementation of FIG. 3 enables an individual or team to keep abreast of the information about the ever-changing technology landscape they are responsible for managing. For example, out of tens of thousands of technology choices, a particular technology landscape may only be using a few hundred technologies. Within that smaller list, it may occur, in a specific example, that Apache is a major component, including 200 different deployments across the technology landscape. Meanwhile, Websphere may be a very minor component, with only two instances. In this case, any new security-related news about Apache would be included at the top of the curated list of articles to be enriched, while Websphere, although in the curated list. would likely be much lower.

In these and similar examples, it may occur that, for example, a specific third-party library in a custom application being used has just been identified as vulnerable, or a specific middleware stack has a new known exploit that reverts the stack back to its original security state. Such obscure, but frequent scenarios, in the context of tens of thousands of technology choices, each with dozens of ways to be configured and secured, may be difficult or impossible for conventional systems to identify, but may be prominently identified and considered using the system of FIG. 3.

Figure 4:
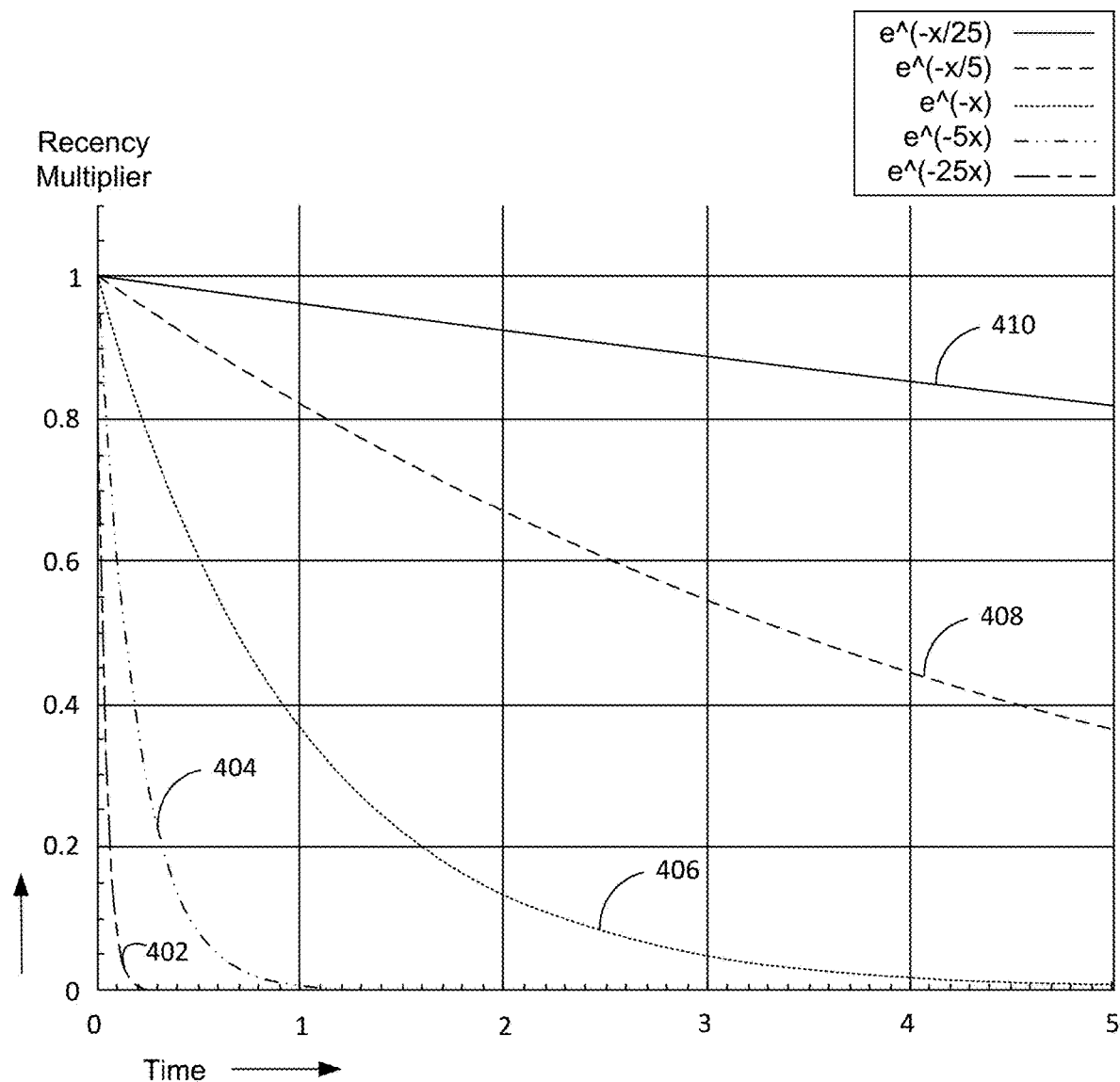
FIG. 4 is a graph illustrating a use of recency as an article selection factor.

FIG. 4 is a graph illustrating a use of recency as an article selection factor. For example, older articles may be less likely to be included, and may be eliminated entirely after a determined amount of time, e.g., 1-2 weeks.

In FIG. 4, score curves 402, 404, 406, 408, 410 are illustrated. As shown, each curve is subject to an exponential smoothing function that may be parameterized in a desired manner.

In the example, a maximum score (or score multiplier) of 1.0 on the vertical axis decays over a period of time represented along the horizontal axis, which may have units of, e.g., days or weeks. For example, the recency score in FIG. 4 for the curve 404 (if horizontal units are in weeks) drops exponentially from a time of being listed and is removed entirely by the end of a week.

Figure 5:
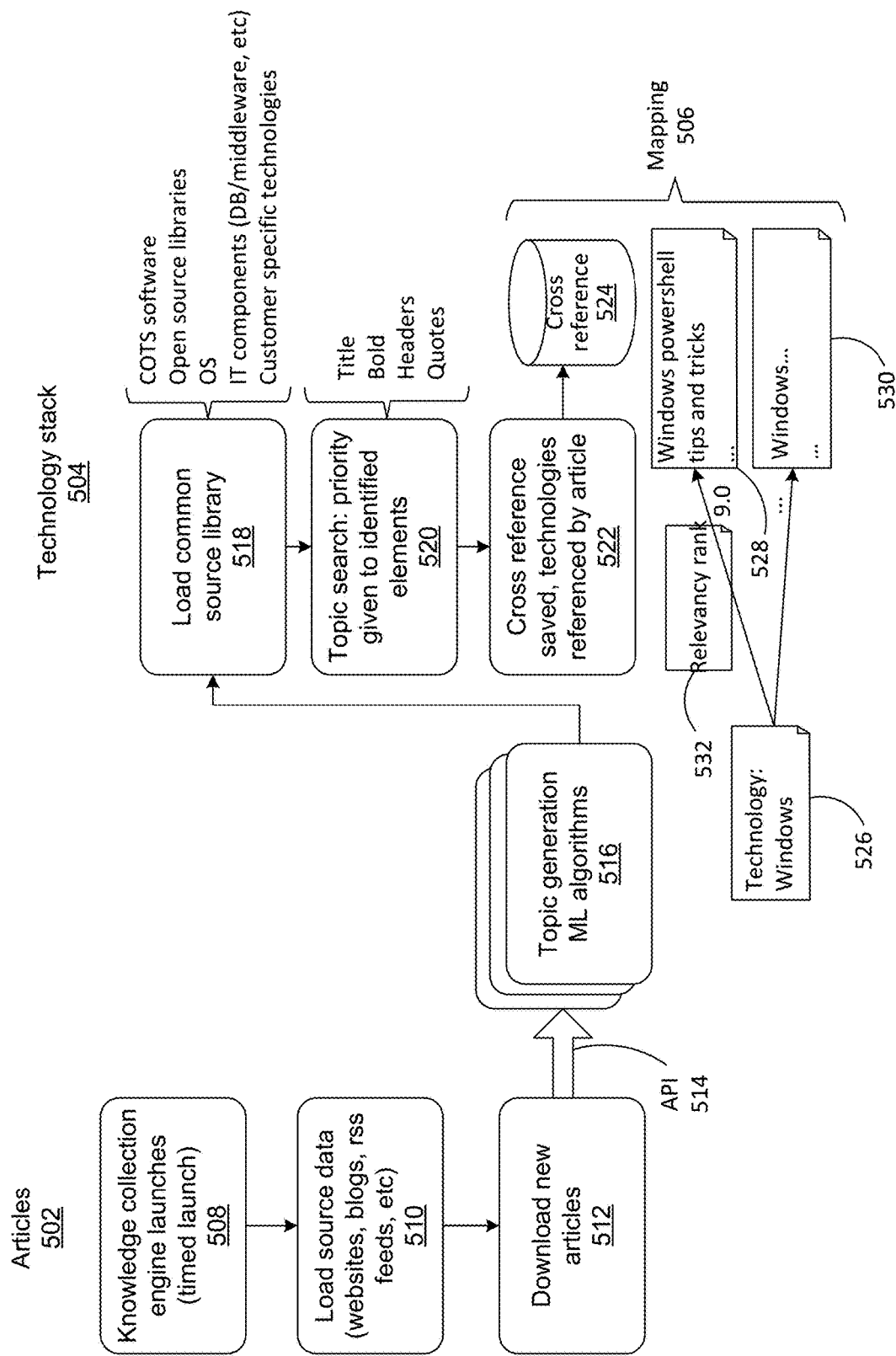
FIG. 5 is a flowchart illustrating more detailed example operations of the curation manager of FIG. 1.

FIG. 5 is a flowchart illustrating more detailed example operations of the curation manager of FIG. 1. In particular, FIG. 5 illustrates examples in which a centralized cross-referencing or mapping service may collect articles from article sources, and correlate the articles to technologies of interest. In the example of FIG. 5, a technology word "Windows" is described and illustrated as having a ranked order of articles that are automatically referenced with an associated relevancy score.

In FIG. 5, articles 502 are collected for a technology stack 504, following by mapping processes 506, as generally described above. More specifically, a knowledge collection engine (e.g., knowledge collection engine 304 of FIG. 3) may be configured to launch at periodic intervals, e.g., several times per day, to crawl through numerous sources of data to identify technology-based articles (502). For example, in the security space, there are countless new articles published every day (or even every hour) about new vulnerabilities in software stacks. The knowledge collection engine loads the resulting source data (510), and downloads new articles (512).

An application programming interface (API) 514 may be used to communicate the articles to one or more topic generation ML algorithm(s) (516) to determine the article context and generate one or more topics to which the article refers. In this regard, a common source library may be loaded (518), where sources may include, e.g., off the shelf software, open source libraries, operating system sources, IT components (e.g., database or middleware), as well as customer-specific technologies.

The topic search (520) may be configured to give priority to identified article elements. For example, emphasis may be placed on article elements such as title, bolded print, headers, or quotes.

The topics may be cross referenced (522) with the common library source of identified technologies (e.g., topic source data 118 of FIG. 1, or the source data 308 of FIG. 3), and saved in a cross-reference repository 524 as part of the mapping process 506. As referenced above, the cross-referencing process may include assigning weights to each article, based on how and where the relevant technology was referenced in the article. Also, as a part of this cross-referencing, relevancy scores may be assigned to each article with respect to each technology topic. The relationship between each article and each corresponding technology topic is included in the cross-reference repository 524 for consumption by a customer specific flow, e.g., of FIG. 6.

FIG. 5 illustrates a specific example of the mapping process 506, with respect to the technology topic, "Windows" 526. As shown, an article 528 and an article 520 may be cross-referenced to the topic 526. Further, a relevancy rank 532 may be assigned to each article.

Figure 6:
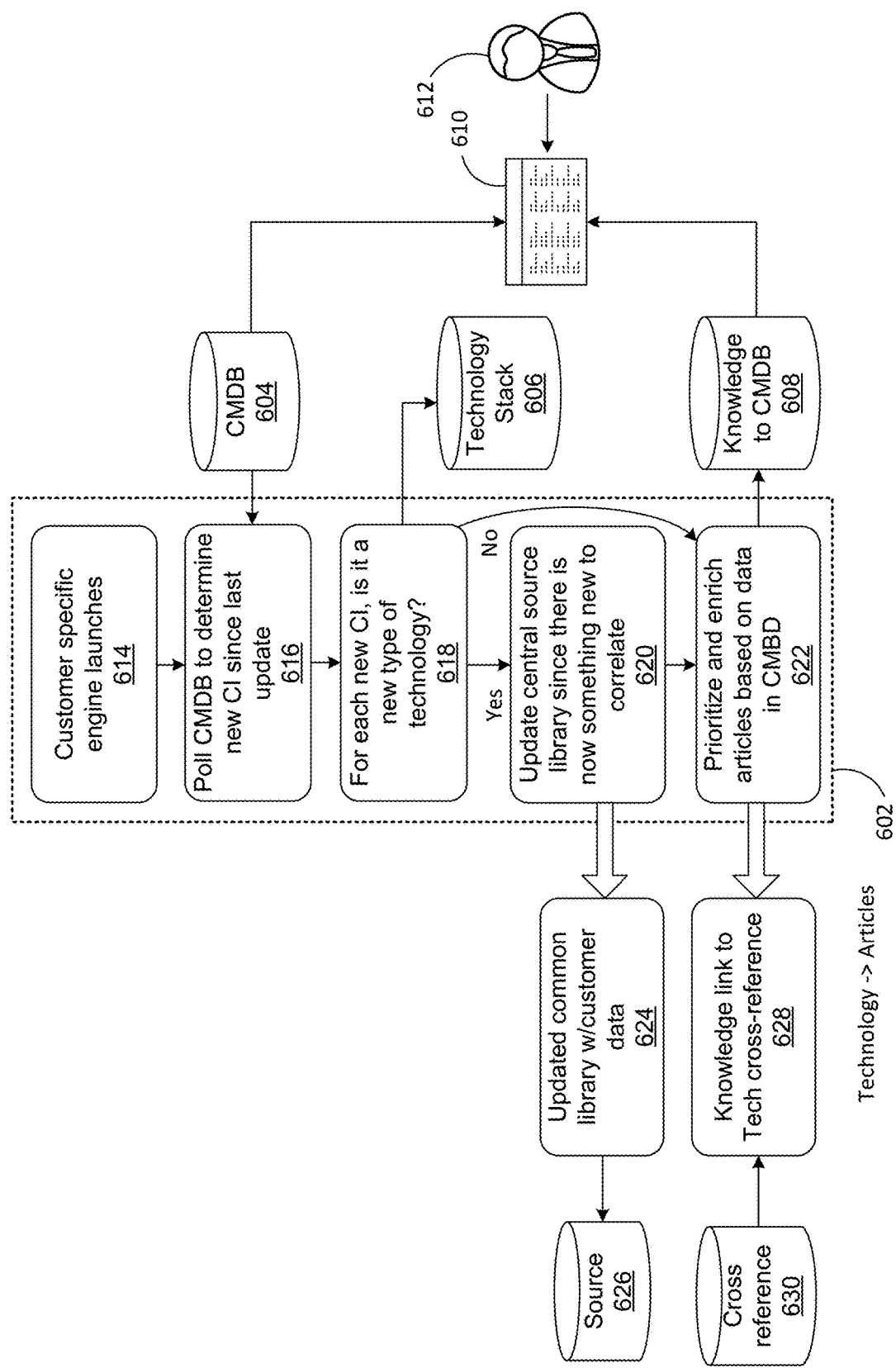
FIG. 6 is a flowchart illustrating more detailed example operations of the content engine of FIG. 1.

FIG. 6 is a flowchart illustrating a process flow initiated from a specific customer's network, and demonstrates examples in which the customer's data is aligned with the processes of FIG. 5, as well as how to prioritize articles to be reviewed by that customer. Thus, FIG. 6 illustrates example process flows of example operations of the content engine 104 of FIG. 1, or content engine 312 of FIG. 3.

In FIG. 6, the illustrated method (602) is utilized to generate a list of curated, prioritized, and enriched articles, based on how the articles relate to the infrastructure an IT administrator manages. For example, a customer specific engine may be configured to launch (614) a few times per day, to poll a CMDB 604 for new Configuration Items (CIs) (616) since the last update.

If a new CI is determined to be included since a time of a most-recent update, then each such new CI may be compared to an existing listing in a current technology stack (606). If a new technology is detected (yes), the content engine may initiate an API call to the central server and "requests" that a new technology be considered for correlation when evaluating sources (620). In this way, a common library of sources 626 (e.g., 118 of FIG. 1, or 308 of FIG. 3) may be updated (624).

For example, a technology such as NginX may be detected upon its initial deployment, in operations 616, 618. Operation 620 may thus represent a call back to a cloud server to execute its cross-referencing service on the technology topic "Nginx".

As shown in FIG. 6, operations 620, 624 may be skipped if no new CIs are detected. Whether new CIs are detected or not, a suitable API may be used to generate prioritized, enriched articles (622), e.g., by accessing and downloading links to technology articles that have been cross-referenced to match the technology stack of the customer (628) from cross reference repository 630, as described herein.

As also described, prioritization may be conducted based on a weighted combination of factors, such as a number and type of deployments. In addition, the articles may be enriched with the actual CIs that are affected by each article to obtain and store a relation between the prioritized, enriched articles and the CMDB 604, as represented by a knowledge-to-CMDB repository 608. In this way, a suitable GUI 610 may provide the prioritized, enriched articles to a user 612.

For example, in the example above, if a local NginX version that has been deployed has many articles about instability, and users are reading this article, the actual CI that is deployed with such NginiX version may be directly linked from the GUI 610.

Figure 7:
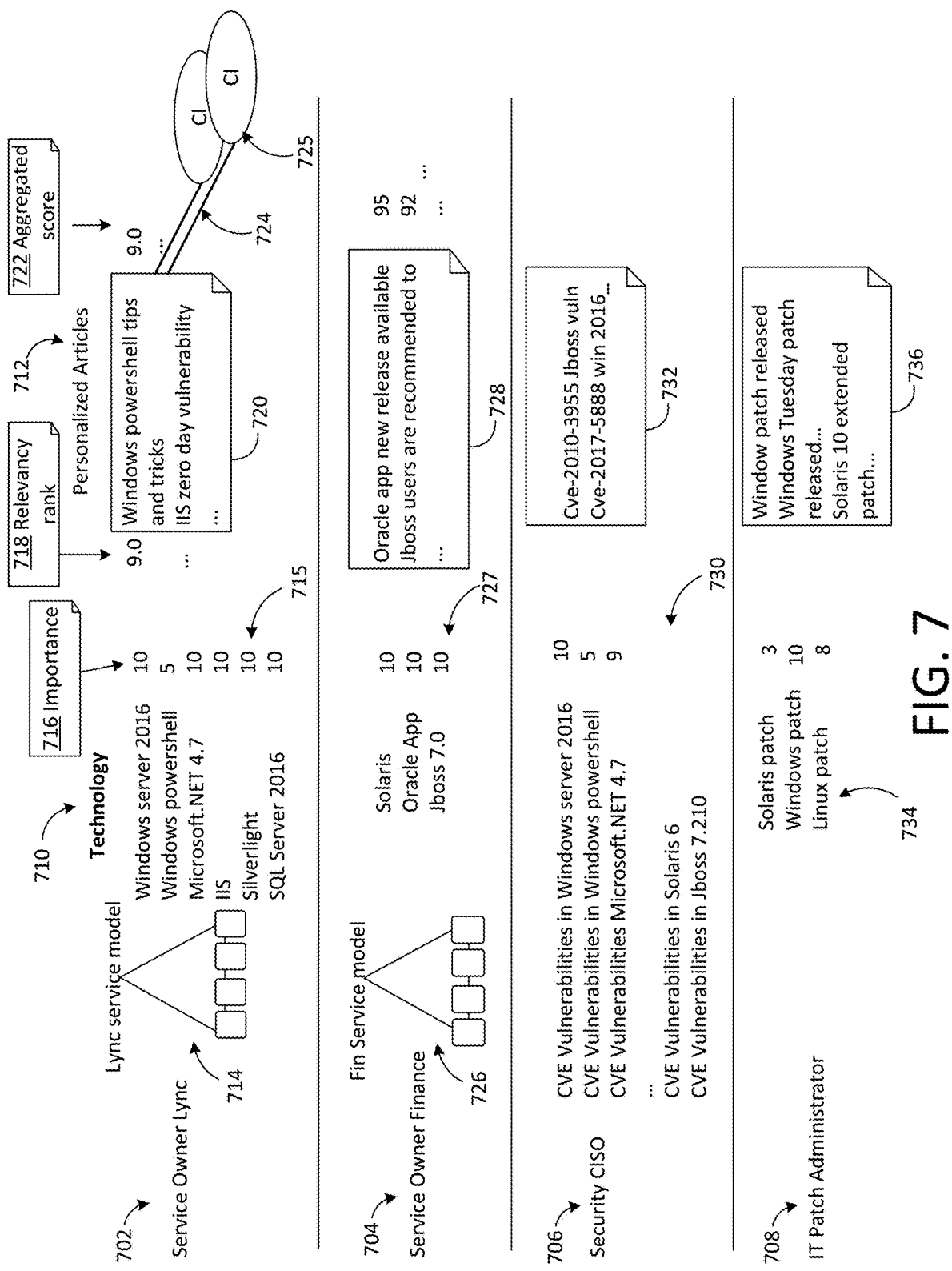
FIG. 7 is a block diagram illustrating role-based article curation for a single content engine of FIG. 1.

FIG. 7 is a block diagram illustrating role-based article curation for a single content engine. In FIG. 7, four personas or roles are illustrated, including a service owner for a Lync service 702, a service owner for finance 704, a service owner acting as chief information security officer (CISO) 706, and a service owner acting as an IT patch administrator 708.

As shown, each of the roles 702-708 has a different subset 715, 727, 730, 734 of technologies for which they are responsible from a total technology listing 710. Technologies for each role may be automatically derived from a corresponding technology stack being managed, or from a service model 714, 726, or may be manually entered.

As shown, each technology listed may be corresponded with an importance 716. Individual technology strings may have associated modifiers, such as 'vulnerability,' or 'patch.' For example, the CISO 706 may be more interested in security knowledge impacting all of the technologies, so that the technology strings 730 have security information filters attached.

As previously described, the importance factors 716 may be automatically derived. For example, the importance factors 716 may be derived based on a number of IT assets of each type, relationships between the IT assets, and various other factors. In the example of FIG. 7, it may occur that Windows machines are predominant, and have a highest importance rating of 10.

For each technology listing, personalized articles 712 may be generated. Each article set 720, 728, 732, 736 may be obtained from the available article-topic cross reference repository, along with a corresponding relevance rank 718. In FIG. 7, a joint score 722 may then be computed as a combination of the importance 716 and the relevancy rank 718.

Each article may be enriched, e.g., by providing links 724 to corresponding CIs 725 within a CMDB (not shown in FIG. 7). Enrichment may also include embedded content or context identifying or explaining a connection between identified article content and a corresponding CI. Enrichment may also include suggested fixes, remedies, or other approaches to responding to the identified issues.

The systems and techniques described herein provide automated ways of obtaining curated knowledge, based on technology and IT assets within a particular ecosystem. Article content may be prioritized based on, e.g., a proliferation of technology throughout the ecosystem, and/or a number and type of service-based relationships.

Additionally, discovered articles may be enriched with managed infrastructure information. Articles may be presented that are associated with each CI, and a prioritized list based on a corresponding role or persona may be generated, so that, e.g., different personas for the same CI will see different articles.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machinereadable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:
   receive configuration data from landscape inventory data characterizing configuration items of information technology (IT) assets of a technology landscape;
   receive articles collected from article sources identified as being potentially relevant to the technology landscape;
   generate, for each article, at least one topic, based on the configuration data, including a relevancy metric characterizing a degree of relevance of each article to each corresponding topic;
   store the articles with reference to each corresponding topic and relevancy metric;
   select, for the technology landscape, prioritized articles from the articles, based on the landscape inventory data, the topics, and the relevancy metrics;
   identify relevant configuration items of the configuration items that correspond to the prioritized articles; and
   update each of the prioritized articles with enrichment information identifying article portions of the prioritized articles related to the relevant configuration items, to thereby obtain enriched articles, including identifying the relevant configuration items within the enrichment information.

2. The computer program product of claim 1, wherein the landscape inventory data is stored using a configuration management database (CMDB).

3. The computer program product of claim 1, wherein the instructions, when executed, are further configured to cause the at least one computing device to:
   collect the articles from network-available articles, based on the configuration data.

4. The computer program product of claim 1, wherein the instructions, when executed, are further configured to cause the at least one computing device to:
   generate the at least one topic generation using a machine learning algorithm parameterized using the configuration data.

5. The computer program product of claim 1, wherein the instructions, when executed, are further configured to cause the at least one computing device to:
   select the prioritized articles based on the configuration items.

6. The computer program product of claim 1, wherein the instructions, when executed, are further configured to cause the at least one computing device to:
   select the prioritized articles based on relationships between the configuration items within the technology landscape, as determined from the landscape inventory data.

7. The computer program product of claim 1, wherein the instructions, when executed, are further configured to cause the at least one computing device to:
   select the prioritized articles based on a recency score assigned to each article, the recency score being based on corresponding publication dates of the articles.

8. The computer program product of claim 1, wherein the instructions, when executed, are further configured to cause the at least one computing device to:
select the prioritized articles based on a threat level assigned to the topic and to the configuration data.

9. The computer program product of claim 1, wherein the instructions, when executed, are further configured to cause the at least one computing device to:
enrich at least one of the prioritized articles with enrichment information including a link to at least one corresponding configuration item of the configuration items, provided in conjunction with a corresponding article portion of the at least one of the prioritized articles.

10. A computer-implemented method, the method comprising:
receiving configuration data from landscape inventory data characterizing configuration items of information technology (IT) assets of a technology landscape;
receiving articles collected from article sources identified as being potentially relevant to the technology landscape;
generating, for each article, at least one topic, based on the configuration data, including a relevancy metric characterizing a degree of relevance of each article to each corresponding topic;
storing the articles with reference to each corresponding topic and relevancy metric;
selecting, for the technology landscape, prioritized articles from the articles, based on the landscape inventory data, the topics, and the relevancy metrics;
identifying relevant configuration items of the configuration items that correspond to the prioritized articles; and
updating each of the prioritized articles with enrichment information identifying article portions of the prioritized articles related to the relevant configuration items, to thereby obtain enriched articles, including identifying the relevant configuration items within the enrichment information.

11. The method of claim 10, wherein the landscape inventory data is stored using a configuration management database (CMDB).

12. The method of claim 10, further comprising:
generating the at least one topic generation using a machine learning algorithm parameterized using the configuration data.

13. The method of claim 10, further comprising:
selecting the prioritized articles based on the configuration items.

14. The method of claim 10, further comprising:
selecting the prioritized articles based on relationships between the configuration items within the technology landscape, as determined from the landscape inventory data.

15. The method of claim 10, further comprising:
selecting the prioritized articles based on a recency score assigned to each article, the recency score being based on corresponding publication dates of the articles.

16. The method of claim 10, further comprising:
selecting the prioritized articles based on a threat level assigned to the topic and to the configuration data.

17. The method of claim 10, further comprising:
enriching at least one of the prioritized articles with enrichment information including a link to at least one corresponding configuration item of the configuration items, provided in conjunction with a corresponding article portion of the at least one of the prioritized articles.

18. A system comprising:
at least one memory including instructions; and
at least one processor that is operably coupled to the at least one memory and that is arranged and configured to execute instructions that, when executed, cause the at least one processor to
receive configuration data from landscape inventory data characterizing configuration items of information technology (IT) assets of a technology landscape;
receive articles collected from article sources identified as being potentially relevant to the technology landscape;
generate, for each article, at least one topic, based on the configuration data, including a relevancy metric characterizing a degree of relevance of each article to each corresponding topic;
store the articles with reference to each corresponding topic and relevancy metric;
select, for the technology landscape, prioritized articles from the articles, based on the landscape inventory data, the topics, and the relevancy metrics;
identify relevant configuration items of the configuration items that correspond to the prioritized articles; and
update each of the prioritized articles with enrichment information identifying article portions of the prioritized articles related to the relevant configuration items, to thereby obtain enriched articles, including identifying the relevant configuration items within the enrichment information.

19. The system of claim 18, wherein the system is further configured to:
select the prioritized articles based on relationships between the configuration items within the technology landscape, as determined from the landscape inventory data.

20. The system of claim 18, wherein the system is further configured to:
enrich at least one of the prioritized articles with enrichment information including a link to at least one corresponding configuration item of the configuration items, provided in conjunction with a corresponding article portion of the at least one of the prioritized articles.

* * * * *